(12) United States Patent
Fenton

(10) Patent No.: US 7,347,067 B2
(45) Date of Patent: Mar. 25, 2008

(54) MOLD FOR AN I.S. MACHINE

(75) Inventor: F. Alan Fenton, Granby, CT (US)

(73) Assignee: Emhart Glass SA, Cham (CH)

( * ) Notice: Subject to any disclaimer, the term of this patent is extended or adjusted under 35 U.S.C. 154(b) by 110 days.

(21) Appl. No.: 11/270,920

(22) Filed: Nov. 10, 2005

(65) Prior Publication Data
US 2007/0104820 A1    May 10, 2007

(51) Int. Cl.
*C03B 11/14* (2006.01)
*B29C 33/22* (2006.01)
*B41B 11/62* (2006.01)
*B28B 17/00* (2006.01)

(52) U.S. Cl. .............................. 65/323; 65/227; 65/243; 65/305; 249/139; 249/102; 425/195; 425/450.1; 425/451.9

(58) Field of Classification Search ................. 425/195, 425/450.1, 451.9; 65/227, 78, 140, 166, 65/174, 184, 207; 249/139, 102
See application file for complete search history.

(56) References Cited

U.S. PATENT DOCUMENTS

| | | | | |
|---|---|---|---|---|
| 1,409,591 A | * | 3/1922 | Schavoir | 249/102 |
| 3,807,928 A | * | 4/1974 | Horberg et al. | 425/526 |
| 4,202,522 A | * | 5/1980 | Hanas et al. | 249/102 |
| 4,690,703 A | * | 9/1987 | Kulig | 65/265 |
| 4,714,421 A | * | 12/1987 | D'Agostino | 425/192 R |
| 5,234,205 A | * | 8/1993 | Shanley | 269/99 |
| 5,865,868 A | | 2/1999 | Slocum et al. | |
| 5,902,370 A | * | 5/1999 | Lovell et al. | 65/359 |
| 6,065,950 A | * | 5/2000 | Spiess | 425/11 |
| 6,766,677 B1 | * | 7/2004 | Turnbull | 72/348 |
| 6,955,210 B2 | * | 10/2005 | Matsuura et al. | 164/339 |

FOREIGN PATENT DOCUMENTS

FR     510332     12/1920

* cited by examiner

*Primary Examiner*—Eric Hug
*Assistant Examiner*—DeMaris R. Wilson
(74) *Attorney, Agent, or Firm*—Spencer T. Smith

(57) ABSTRACT

A mold is disclosed which has a vertical front face having a glass object surface defined therein and a stepped vertical rear surface. The upper portion of the rear surface projects outwardly from the lower portion of the rear surface. The lower rear surface includes the top surface of two vertically spaced pairs of "T"s.

3 Claims, 4 Drawing Sheets

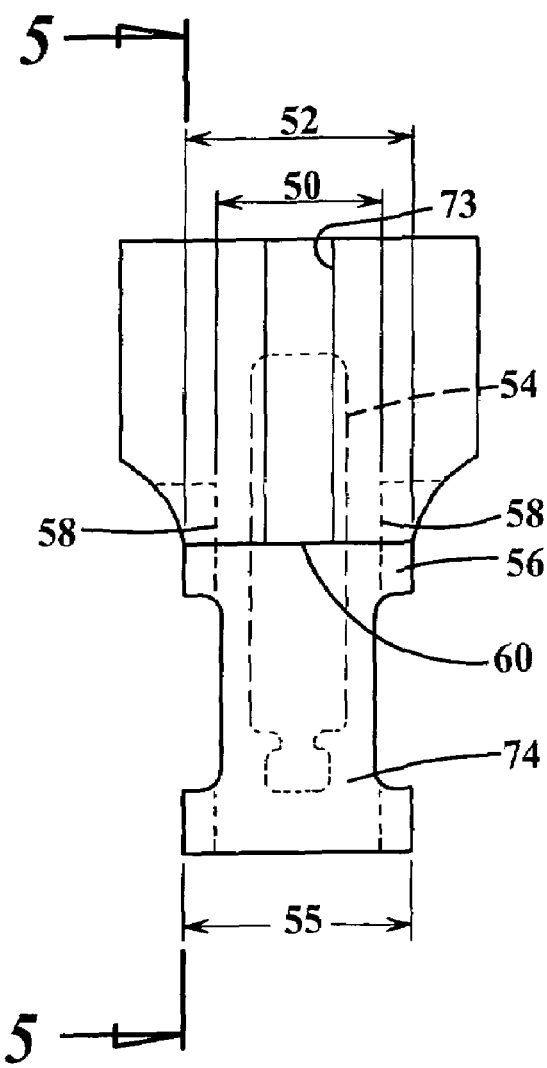

MOLD FOR AN I.S. MACHINE

The present invention relates to I.S. (individual section) machines, which produce glass bottles and more particularly to the mold open and close mechanisms for those machines and the molds used in these mechanisms.

BACKGROUND OF THE INVENTION

An I.S. machine includes a plurality (usually 6, 8, 10 or 12) of identical sections. Each section has a blank station including a mold opening and closing mechanism having a pair of opposed mold arms which is displaceable between mold open and mold closed positions. A mold arm supports a number of inserts on which are placed anywhere from one to four blank mold halves. Each section also has a blow station including a similar mold opening and closing mechanism.

U.S. Pat. No. 5,865,868 illustrates a conventional mold open and close mechanism wherein the mold arms are supported for axial displacement. Mounted on the arm are upper and lower inserts, which will hold one half of each of the required molds pairs. In a triple gob application, an insert may have a first insert portion to support two mold halves and a second insert portion to support one mold half with the first insert portion being mounted relative to the second insert portion to equalize the clamping forces when the molds are closed.

OBJECTS OF THE INVENTION

It is an object of the present invention to provide an improved mold closing mechanism for an I.S. machine and improved molds for use therewith.

Other objects and advantages of the present invention will become apparent from the following portion of this specification and from the accompanying drawings, which illustrate a presently preferred embodiment incorporating the principles of the invention.

BRIEF DESCRIPTION OF THE DRAWINGS

FIG. 4 is a rear view of one of the molds shown in FIG. 1; and

FIG. 5 is a view of the mold shown in FIG. 4 taken at 5-5 thereof.

BRIEF DESCRIPTION OF THE PREFERRED EMBODIMENT

Figure 1:
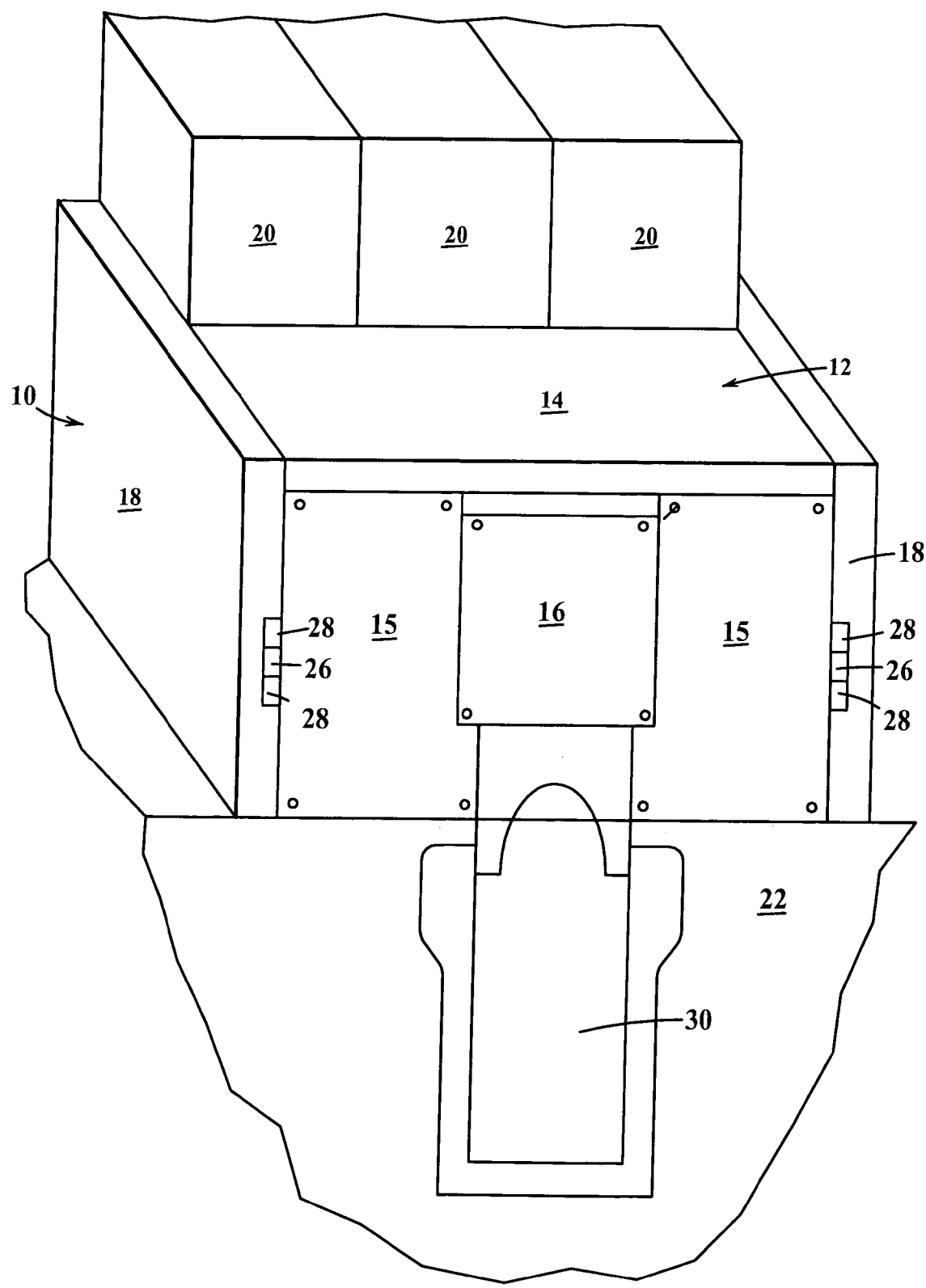
FIG. 1 is a rear oblique view of a portion of a mold open and close mechanism for an I.S. machine.

Each section of an I.S. machine has a blank station and a blow station with each station having an opposed pair of mold open and close mechanisms. FIG. 1 illustrates one of these mechanisms. The mold open and close mechanism 10 includes a housing 12 having a top wall 14 and a rear wall made up of outside panels 15 and a central panel 16. Connected to the housing at either side is an extended wall 18. Also shown are three molds 20, which are located at the mold open position. The housing is located on top of a section box 22.

Figure 2:
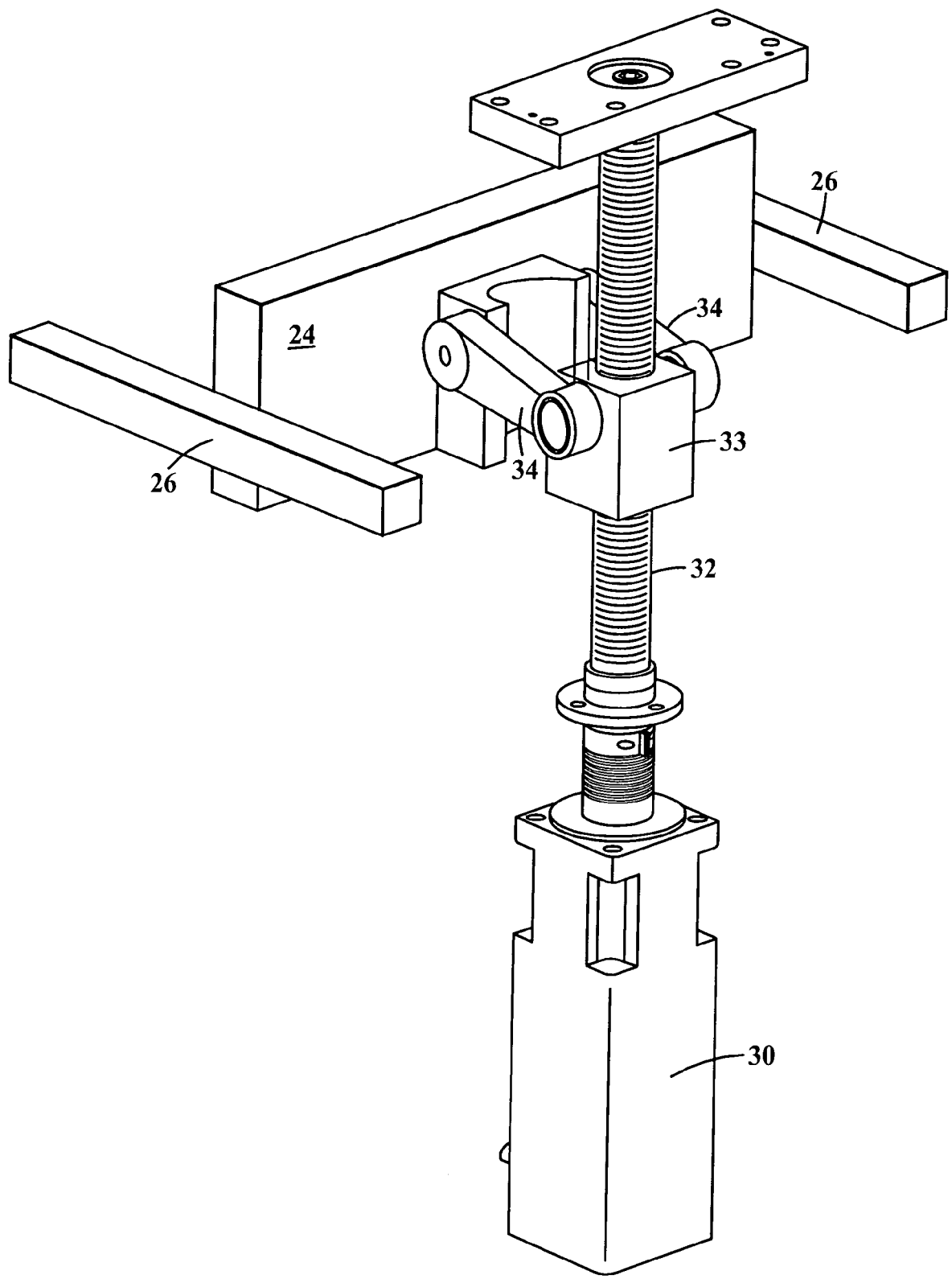
FIG. 2 is a similar view of the mold carrier and drive portions of the portion of the mold open and close mechanism shown in FIG. 1.

The molds 20 are mounted on a mold carrier or bracket 24 (FIG. 2) which is secured to a pair of rails 26. The rails are located in upper and lower slide bearings 28 in the extended walls 18 (FIG. 1). The mold carrier is displaced by a drive which includes a servo motor 30 coupled to a drive screw 32 which is operatively associated with a drive nut 33. A pair of toggle links 34 interconnect the drive nut and the carrier 24. The carrier can accordingly be displaced from a closed position to an open position.

Figure 3:
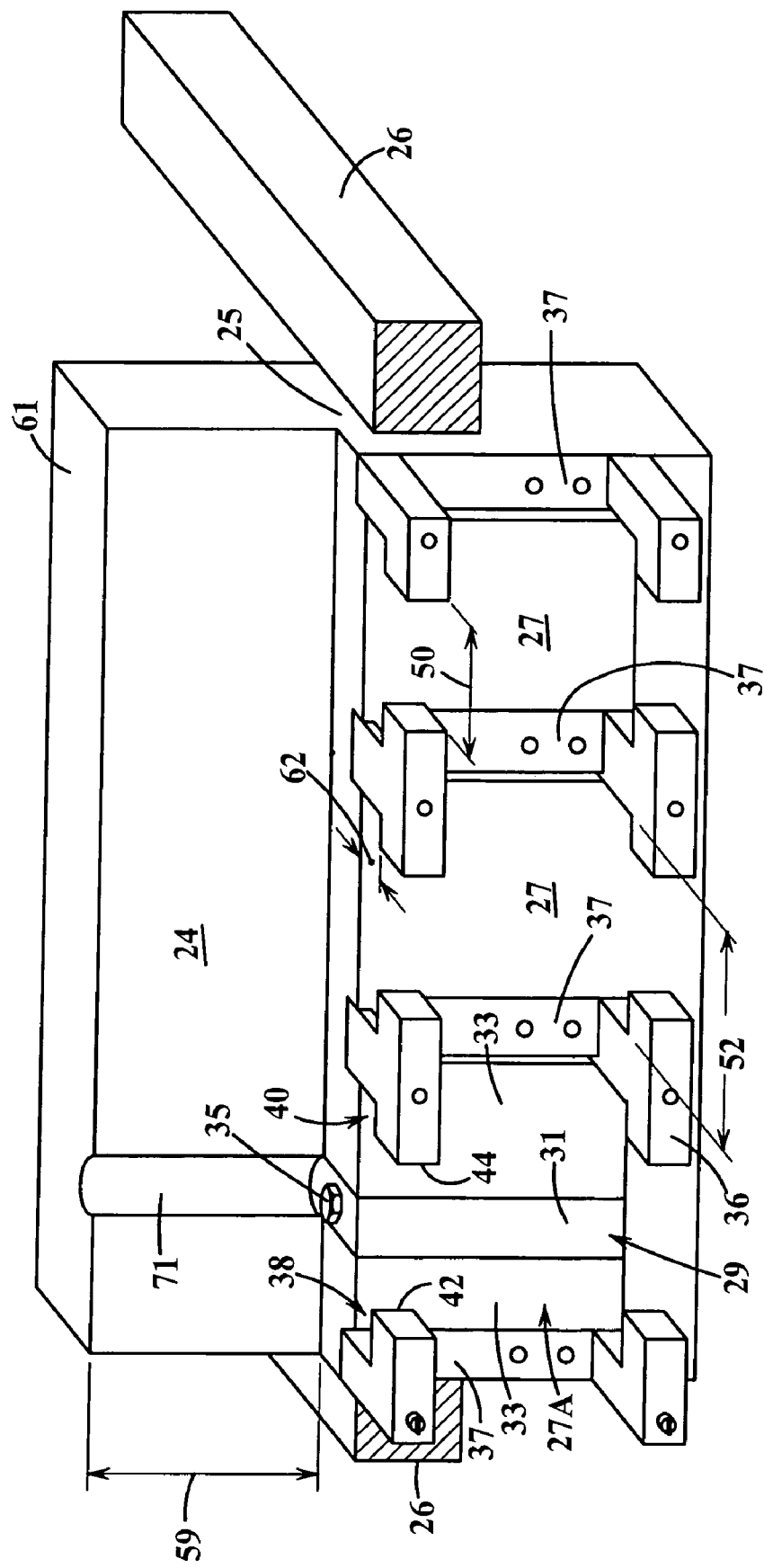
FIG. 3 is a front oblique view of the mold carrier shown in FIG. 2.

The inside surface of the carrier is shown in FIG. 3. Projecting outwardly from the inside surface of the carrier 24 is a mold mounting portion 25, which includes a number of mold engagement surfaces 27, 27A. Two varieties are shown. In the first, there is a simple planar vertical wear surface 27. In the second, a vertical wedge member 29 having a front planar vertical mold engagement surface 31, is located between side vertical planar mold engagement surfaces 33 to define the mold engagement surface 27A. These three mold engagement surfaces start out coplanar but should it become necessary to displace the supported mold toward its opposing mold, the wedge can be operated via screw 35, to advance the front vertical mold engagement surface of the wedge. In practice one mold carrier could have the simple mold engagement surface 27 and the other could carry the other variety or both could be the same depending on preference.

Lower and upper pairs of lugs 36 for each mold are located within vertical slots 37 in the mold mounting portion 25 and are secured to the carrier. Associated pairs of lugs have left 38 and right 40 notches, which with inside surfaces 42, 44, define a "T" slot. The lugs have a selected horizontal spacing 50 therebetween and the notches have a selected separation 52. The lower lugs can be located at a variety of heights so that molds having a variety of heights can be accommodated. The upper and lower lugs accordingly define a vertically extended "T" shaped locating slot.

FIGS. 4 and 5 illustrate one of the molds shown in FIG. 1. The molds illustrated are blank molds (the parison surface 54 is shown with dotted lines) but they could also be blow molds producing bottles from parisons. Each mold has a locating structure or key 55 in the form of a vertically extending "T" made up of the upper and lower top "T" portions 56 having the width 52 and the perpendicular support portion of the "T" 58 having the width 50 which extends from the top of the upper top "T" portion (from flange 60) to the bottom of the mold (the bottom of the lower "T" portion). The width 57 (FIG. 5) of the top of the "T" portions 56 is smaller than the corresponding dimension of the notches 38, 40 allowing movement of the wedge device 29 to push the mold toward its associated mold.

A mold is horizontally located in position by lowering this "T" shaped key into a "T" slot in the carrier. The mold will be vertically located when the horizontal flange 60 comes to rest on the top surface 62 of the lug mounting bracket and accordingly the vertical distance 59 between the flange 60 and the top surface 61 of the mold carrier will define the vertical location of the mold.

An opposed mold pair will achieve the desired alignment relative to one another by forming one mold face with an inner bevel and the other mold face with an outer bevel or with any other alignment device. As shown, each "T" shaped key has a rear vertical face, which is parallel to the front vertical surface 72 of the mold. When the molds are closed, this flat lower surface will be forced against the adjacent wear plate. Matched cut outs 71, 73 allow tool access to the wedge adjusting screw 35.

What is claimed is:

1. A mold half for an I.S. machine comprising
a flat vertical front face,
a surface defining half of a surface of a glass object in said flat vertical front face,
said mold half having upper and lower portions,
the upper mold half portion having a rear face and
the lower mold half portion having a rear flat vertical face portion parallel to said flat vertical front face for transferring clamping forces applied to the flat vertical front face,
the rear face of the upper mold half portion joining the rear face of the lower mold half portion at a horizontal flange, and
the lower mold half portion including a vertically extending "T" shaped key having a vertically extending "T" shaped rear surface and a top,
said rear flat vertical face portion including the vertically extending "T" shaped rear surface of the "T" shaped key.

2. A mold half according to claim 1, wherein said vertically extending "T" shaped key includes upper and lower pairs of top "T" portions.

3. A mold half according to claim 1, wherein said horizontal flange defines the top of said vertically extending "T" shaped key.

* * * * *